Figure 1:
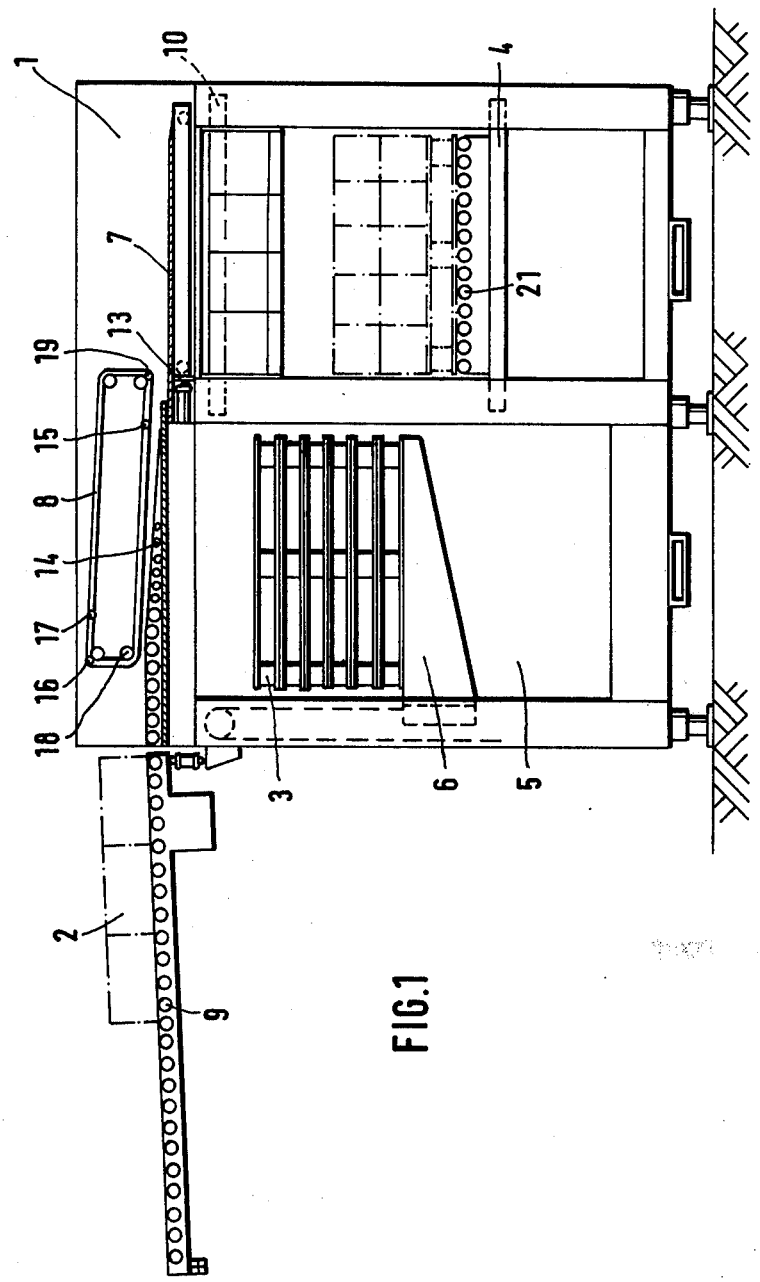

United States Patent [19]

Janson

[11] 4,058,225
[45] Nov. 15, 1977

[54] METHOD FOR LOADING A LAYER OF GOODS ON A MOVABLE SUPPORTING MEANS AND A PALLET LOADER FOR CARRYING OUT THE METHOD

[76] Inventor: Bernt Owe Janson, Smedbergsvagen 10,, 43700 Lindome, Sweden

[21] Appl. No.: 764,524

[22] Filed: Jan. 31, 1977

Related U.S. Application Data

[63] Continuation of Ser. No. 654,474, Feb. 2, 1976, abandoned.

[51] Int. Cl.² .............................................. B65G 37/24
[52] U.S. Cl. .................................. 214/6 P; 214/8.5 F
[58] Field of Search ................ 214/6 P, 6 DK, 8.5 A, 214/8.5 F

[56] References Cited

U.S. PATENT DOCUMENTS

| | | | |
|---|---|---|---|
| 3,050,199 | 8/1962 | McGrath et al. | 214/6 P |
| 3,402,830 | 9/1968 | Copping et al. | 214/6 P |
| 3,844,422 | 10/1974 | Smith et al. | 214/6 P |
| 3,934,713 | 1/1976 | Van der Meer et al. | 214/6 PX |
| 3,954,190 | 5/1976 | Howard et al. | 214/6 P |

*Primary Examiner*—L. J. Paperner

[57] ABSTRACT

A device for stacking articles on pallets in which a supply of empty pallets is disposed next to a loading device and the top pallet is transferred to a support having laterally displaceable bars at the top of the loading device. The pallet after having been loaded is raised by an elevator a short distance above the support to permit the displaceable bars to be displaced laterally beyond the dimensions of the pallet so that the loaded pallet can be lowered to an appropriate level for removal from the loading device.

5 Claims, 4 Drawing Figures

METHOD FOR LOADING A LAYER OF GOODS ON A MOVABLE SUPPORTING MEANS AND A PALLET LOADER FOR CARRYING OUT THE METHOD

This is a (X) Continuation, of application Ser. No. 654,474, Filed Feb. 2, 1976, now abandoned.

The present invention relates to a method for the loading of goods on a movable supporting means, called pallet, utilizing a device, called pallet loader, in connection with which method empty pallets are stored in a pallet storage and for the loading of the layers of goods one by one are transferred from the pallet storage to an elevator device for the transportation of the pallet in vertical direction.

The invention also relates to a pallet loader for carrying out the method in practice, which pallet loader is provided with storing means for empty pallets, which storage comprises an elevating platform for a pile of empty pallets and a transfer device for a pallet between the storage and an elevator device for the vertical movements of the pallet and a device for feeding layers of goods onto the pallet.

The loading of layers of goods on pallets by means of this method as well as with the pallet loader mentioned is a comparatively slow procedure, especially because of the fact that after the loading of a pallet the next pallet has to wait until the previously loaded pallet has been fed out of the pallet loader and an empty pallet has been transferred to the elevator device, and said device has been elevated into a position for the loading of the empty pallet. This results in a very low loading capacity, when one utilizes a pallet loader according to the known method for loading and with the previously known pallet loader.

The drawback mentioned and also other inconveniences have been eliminated in connection with the method according to the present invention, a principal reason being that an empty pallet is transferred from the pallet storage, preferably from its top, to a supporting means for the pallet arranged above the elevator device, that the pallet is supported on said supporting means, and that one or several layers of goods are transferred to the pallet by means of a feeding device, the supporting means after the loading of a layer of goods suitably being lowered a distance corresponding the height of the layer of the goods until one or several layers of goods have been loaded onto the pallet and the elevator device in connection therewith has been raised up to supporting contact under the supporting device and thereafter has been raised still another distance, so that the pallet is transferred from the supporting device to the elevator device, whereafter the supporting device is displaced out of the way for the pallet, and the latter one, resting on the elevator device, step by step is being lowered for loading of additional layers of goods on the pallet, if so required, in order to complete the loading of the pallet, whereafter the pallet, its loading now having been completed, resting on the elevator device, is lowered to a feeding out position for the completely loaded pallet and is fed out of the pallet loader.

The drawbacks with the type of pallet loaders, to which the present invention too is related, have been totally eliminated by the pallet loader according to the invention, especially because of the tranferring device comprising a carrier, which can be displaced in forwards and backwards directions between the top of the pile of pallets in the pallet storage and a supporting device arranged above the elevator device for the pallet, and by said supporting device being displaceable in vertical direction between the feeding device and the elevator device.

Figure 2:
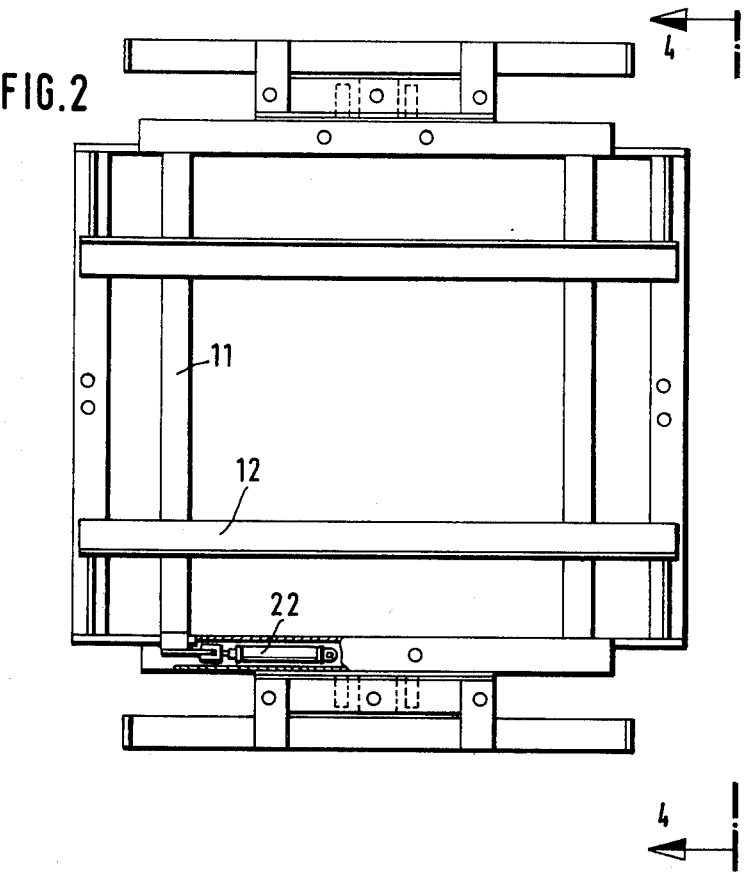
Figure 3:
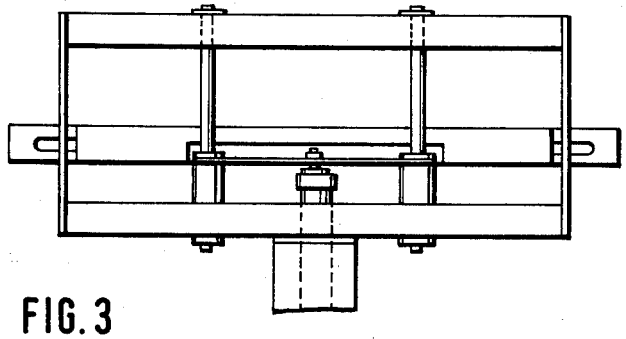
Figure 4:
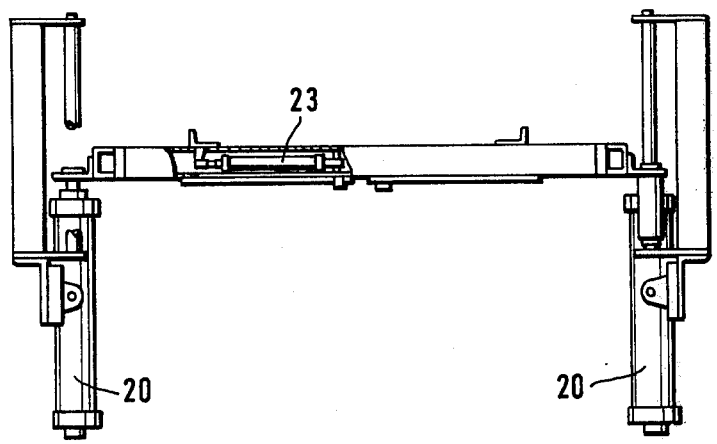

An example of the method according to the invention and an embodiment of the pallet loader according to the invention will now be described reference being made to the accompanying drawings, in which FIG. 1 is a lateral view of the pallet loader, FIG. 2 is a view of the pallet loader as seen from above, FIG. 3 shows a means for the vertical displacement of the supporting device, and FIG. 4 shows the supporting device as seen in a vertical section 4—4 in FIG. 2 across the supporting device between the elevator devices on each side of the supporting device.

In the starting position of the loading cycle of the pallet loader 1 it is empty with respect to boxes 2 as well as pallets 3. The elevator device 4 is in its low position. This is also the case with the vertically displaceable platform 6 of the pallet storage 5. A load supporting plate 7 for a layer of goods to be loaded on a pallet 3 and a feeding device 8 for the transfer of said goods to the supporting plate 7 are in position to receive a layer of goods in the positions illustrated in FIG. 1.

A conveyor 9 for the infeed to the pallet loader is in a horizontal position. A supporting device 10 for a pallet 3 is in upper position with supporting steel bars 11,12 for a pallet 3 in the proper position for loading.

The pallet loader 1 is a mechanical design. Movable parts are actuated by pneumatic cylinders and electric motors. The automatic equipment comprises a light current system and a pneumatic system.

At the start of the pallet loader 1 the pallet storage 5 is filled with a pile of 10 pallets 3. In the standard design of the pallet loader 1 the pallets 3 are placed in the pallet storage 5 by means of a truck. Automatic filling of pallets 3 in the pallet storage 5 can be arranged. Thereafter the main switch of the pallet loader 1 is actuated. The pneumatic system then is filled with pressurized air (60KPa). The control units of the automatic equipment are supplied with 24 volt alternating current, and the working units with the required power current.

The starting button 1 of the pallet loader is thereafter actuated. The load supporting plate 7 retrogrades, the platform 6 of the pallet storage 5 rises and is halted upon a pulse from the top pallet 3 of the pile, when its upper edge is about 10 mm below the load supporting plate 7. This plate now starts its return movement. A carrier 13 on the load supporting plate 7 then brings with it the top pallet 3 of the pile of the pallet storage 5. The pallet 3 glides over onto the supporting iron bars 11,12 of the supporting device.

The infeed conveyor 9 now rises, and boxes 2 waiting their turn get a free passage to the pallet loader 1. The infeed conveyor 9 now occupies a somewhat inclined position towards the pallet loader 1. This brings in its train that a slit is formed at the top edge of the endwalls of the boxes 2, when they leave the infeed conveyor 9 and arrive on the pallet loader 1. A computation of the number of units passing is thereby made possible.

Boxes 2 are collected on a conveyor 14 in the pallet loader 1 and are stopped against a stop organ 15. When the right number of boxes 2 have been counted, the infeed conveyor 9 is lowered and locked in its low position. Subsequent boxes 2 are now stopped against a second stop organ in the rear edge of the pallet loader 1.

At a ready signal from a photo-electric cell covering the area between the infeed conveyor 9 and a feed roller 16 the infeed device 8 for the boxes 2 starts to move. When a stop organ 17 on said device has passed a pulley 18 belonging to the feeding device 8, the infeed conveyor 9 is again raised and a new feeding operation can be started.

The load is transferred to the load supporting plate 7. When the first and a second feed roller (16 and 19 respectively) of the feeding device 8 have changed place, the load supporting plate 7 starts its retrograding motion. In this connection the feed roller 16 functions as a stop. The load is forced to leave the load supporting plate 7 and is placed on the pallet placed below the same. The carrier 13, which is movable, retrogrades in direction rear to the edge of the load supporting plate 7. The mobility is necessary in order to prevent the carrier 13 from engaging a load, which exhibits an overhang over the rear edge of the loading pallet 3. Now see the FIGS. 2-4 of the drawing.

Pressure cylinders 20 of the supporting device 10 perform a negative sequence, i.e. they lower the pallet 3 with its load so much that the load supporting plate 7 can travel clear of the load. The elevator device 4 starts an upwards movement and stops, when a conveyor 21 provided on the elevator device has eased the pallet 3 from the supporting iron bars 11,12 of the supporting device 10. The supporting iron bars 11,12 are displaced towards their extreme positions by action of the pressure cylinders 22 and 23 respectively. The pressure cylinders 20 now perform a positive sequence, and the supporting device 10 occupies the starting position with the supporting iron bars 11,12 for a pallet 3 in outer position. The pallet 3 now stands entirely on the roller conveyor 21 of the elevator device 4. See again the drawing FIG. 1.

A new layer of boxes 2 has now been collected behind the stop organ 17, and a new transfer of load to the load supporting plate 7 commences. When the feeder roller 19 has reached its forward position, the load supporting plate 7 moves aside, and the load is deposited on top of the load, which already is in place in the elevator device 4. The elevator device 4 starts a downwards movement and stops, when the photo-electric cell under the load supporting plate 7 is lighting up. This cycle is repeated until a desired number of layers have been placed on the pallet 3.

When the last layer of boxes has been placed on the pallet 3 and the elevator device 4 starts to move downwards, a limit switch is actuated causing the elevator device 4 to continue down to the bottom of the pallet loader 1. The load supporting plate 7 is locked in a rear position. The supporting iron bars 11,12 of the supporting device 10 move out towards the center of the pallet loading device 1. The platform 6 of the pallet storage 5 starts an upwards movement and stops in a position 10 mm below the load supporting plate 7, which starts a forward movement. The carrier 13 travels forwards. Thereby a new empty pallet 3 is in position for being loaded on the supporting device 10. Meanwhile the full pallet is transported out of the pallet loader 1. The filling operation of a new pallet can start.

The infeed conveyor can be designed in different manners, either as has been described, or else it can be rigidly mounted with a stop arranged before the edge of the pallet loader, which edge sticks up between the boxes thereby making it possible to count the units passing by.

The photo-electric cells and the limit switches mentioned can be substituted by other type of sensing equipment.

I claim:

1. A device for loading articles onto pallets comprising means for storing a plurality of empty pallets in stacked relation, pallet loading means juxtaposed said pallet storing means, reciprocally movable plate means for transferring the top empty pallet from the stack of pallets to the top of said pallet loading means, said pallet storing means including means for raising the stack of pallets in the storing means after the top pallet has been transferred therefrom, said reciprocally movable plate means being disposed above said top pallet, means for feeding at least one article onto said reciprocal plate means for movement therewith when an empty pallet is transferred from the top of said storing means to the top of said loading means, the at least one article being deposited on said pallet at the top of said loading means when said reciprocal plate means is retracted to the top of said storing means, support means at the top of said loading means including laterally displaceable members for receiving the top pallet from said storing means, elevator means for supporting and raising the loaded pallet above said support means to permit said laterally displaceable members of said support means to be laterally displaced beyond the marginal edges of the loaded pallet, and means for displacing said laterally displaceable members whereby the pallet may then be lowered by said elevator means.

2. A device as claimed in claim 1 and further comprising means for lowering said elevator means and pallet step-wise after a first layer of the articles have been deposited on the pallet by retraction of said reciprocal plate means, whereby additional layers of articles may be deposited on previously deposited layers of articles by reciprocal movement of said reciprocal plate means.

3. A device as claimed in claim 1 wherein said reciprocal plate means is provided with a depending shoulder for engaging the top empty pallet for transfer from the top of said pallet storing means to the top of said pallet loading means.

4. A device as claimed in claim 1 wherein said support means includes a frame having an opening larger than the dimensions of a pallet, said laterally displaceable members comprising spaced, parallel support bars laterally and movably mounted on said frame and means for laterally displacing said parallel support bars toward and away from each other.

5. A device as claimed in claim 1 wherein said article feeding means includes means for selectively feeding a number of said articles onto the top of said reciprocal plate means at one time.

* * * * *